Nov. 11, 1969   V. J. SMITH ET AL   3,477,698
METHOD AND APPARATUS FOR ADDITIVE FEEDING
Filed April 10, 1968

INVENTORS.
Vernon J. Smith
Charles R. Webster
BY
L. E. Hessman Jr.
ATTORNEY

# United States Patent Office 3,477,698
Patented Nov. 11, 1969

3,477,698
METHOD AND APPARATUS FOR ADDITIVE FEEDING
Vernon J. Smith, Lake Jackson, Tex., and Charles R. Webster, Rolling Hills Estates, Calif., assignors to The Dow Chemical Company, Midland, Mich., a corporation of Delaware
Filed Apr. 10, 1968, Ser. No. 720,200
Int. Cl. B01f *15/02, 13/10*
U.S. Cl. 259—25                                   7 Claims

ABSTRACT OF THE DISCLOSURE

An additive feeder adapted to be employed with the hopper of an injection molding machine for molding thermoplastic materials. The additive feeder, which can introduce colorants, nucleating agents, stabilizers, regrinds, and the like, meters the additives into a feed tube extending down into the throat of the hopper. There exists in the hopper, when a moving screw is being fed, an area of cycloidal turbulence of resin particles above the screw towards the forward end of the hopper. The open bottom end of the feed tube is located such that it properly intersects this area of turbulence whereby additives are mixed with the resin particles in the hopper by the swirling action of the resin particles. This results in a uniform mix of the additives and resin particles being fed to the screw. The lower end of the feed tube should be positioned such that the additives are introduced into the part of the swirling resin particle stream moving downward to permit and aid the outflow of additives from the feed tube.

---

Figure 1:
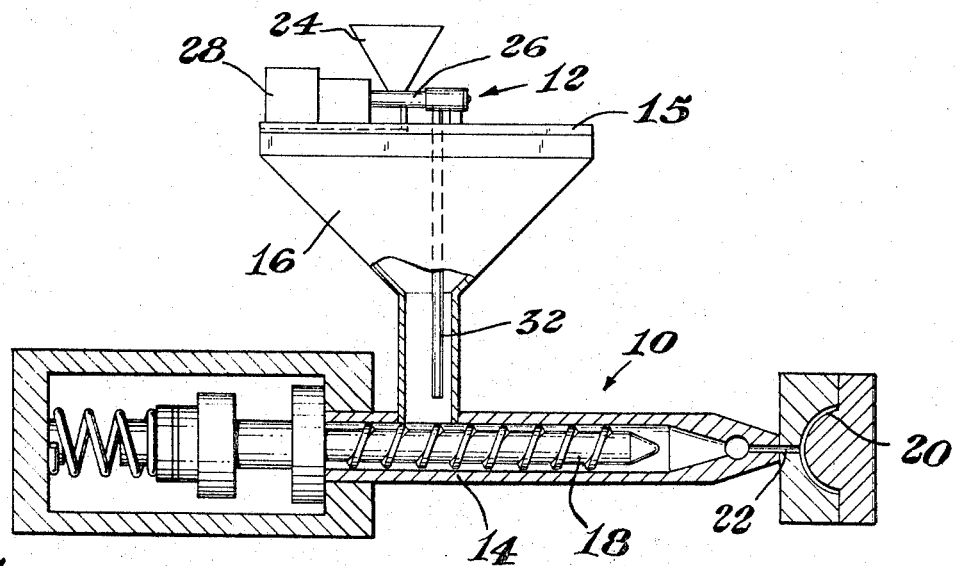

In order to provide for maximum efficiency in injection screw molding operations using apparatus, such as that typically described in U.S. Patent No. 3,124,841, for example, it is extremely desirable to avoid premixing of the granular resin material with additive materials such as colorants, nucleating agents stabilizers, regrinds and the like, and instead introduce such materials directly into the extruder barrel at the same time the granular resin material is being fed thereto. Prior techniques for simultaneous blending of additives with the resin without premixing has involved primarily mixing of two materials in the barrel of molding apparatus, that is, by directly introducing the additive materials at the lower end of the hopper or within the screw itself to obtain direct mixing of the additive materials with the resin by screw action. However, such techniques and the apparatus employed therewith have not been able to disperse adequately and uniformly many pigments or other common dry additives, such that considerable premixing still is common in the art. Furthermore, such techniques and apparatus have been primarily adapted for screw extruders and not for screw injection molding apparatus.

Accordingly, it is an object of the present invention to provide an improved method and apparatus for providing a uniform blend of a broad range of different additive materials simultaneously with the operation of an injection screw molding machine and without premixing.

Briefly, the present invention takes advantage of the discovery that a cycloidal turbulence of resin particles occurs near the forward end of a hopper immediately above the screw of an injection molding machine. By properly locating an additive feeder fill or feed tube within the hopper so that it is dispersing the additive material into the swirling resin particle stream moving downward in the area of turbulence, the additive material so introduced will be entirely and uniformly intermixed. This turbulence is believed to be caused by a load of resin particles which have been picked up by the action of the injection mold screw but are unable to enter the barrel about the screw, which barrel cannot accept the full charge from the screw due to the compression which develops. In the event of plugging of the feed tube, it has been preferably formed of a tube-in-tube construction so that the inner tube, if it became plugged, can be withdrawn and cleaned while the outer tube remains in the hopper so that the hole for the tube does not fill up with resin particles thereby preventing reinsertion of the feed tube into the critical turbulent area in the resin filled hopper. Preferably the feeding of the additive is a controlled feed in a closed system adapted to handle several different types of additives whether in the form of concentrated pellets or granules, or pigmented powder or dry modifying agents and the like. The feeder portion of the additive feeder is preferably programmed with the intermittent injection molding operations of the machine so that the additives are introduced and mixed only when the screw is turning.

Figure 2:
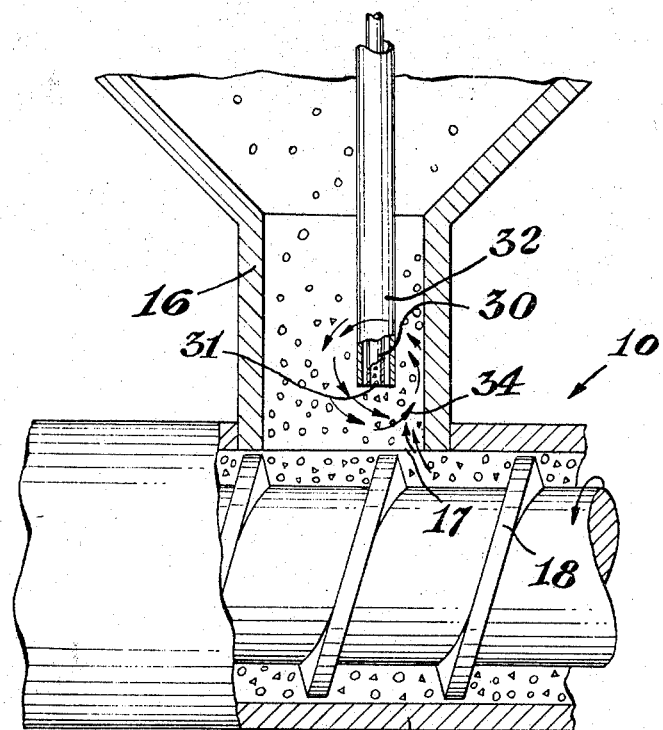

Yet additional objects and advantages of the present invention are even more apparent when taken in conjunction with the accompanying drawing in which like characters of reference designate corresponding material and parts throughout the several views thereof, in which:

FIGURE 1 is a side elevational view partly in section of an injection screw molding machine and an additive feeder constructed in accordance with the principles of the present invention; and FIGURE 2 is an enlarged fragmentary view of the lower end of the feeder and the screw of FIGURE 1 illustrating in more detail the principles of the present invention.

Referring more particularly to the drawing there is shown an injection screw molding machine 10 and an additive feeder 12 assembled therewith. Machine 10 is primarily adapted to accept thermoplastic resins in the form of granules or pellets and is typical of that well known in the art, one embodiment of which is described in some detail in U.S. Patent No. 3,124,841, for example. Briefly, apparatus 10 includes a barrel 14 with a hopper 16 located thereabove and extending through an opening 17 in the top wall of the barrel and in open communication with the interior of the barrel directly above a spring loaded reciprocating screw 18. The screw is rotatable counterclockwise as shown to accumulate resin within the interior of the barrel 14 and is spring loaded so that once sufficient resin material has been accumulated in the barrel, the screw is driven forward so as to, under high pressure, introduce thermoplastic material into an injection mold cavity 20 through a sprue 22.

In the embodiment shown, additive feeder 12 is supported on a frame 15 which is clamped across the open mouth of hopper 16 so as to be securely fixed thereto. Basically, additive feeder 12 comprises an additive hopper 24 located directly above a metering screw (not shown) located in barrel 26. The metering screw is driven by a variable speed drive mechanism 28 which can be of any conventional design and preferably is programmed so that the metering screw operates only when the screw 18 is turning. The metering screw feeds the additive material into a feed tube 30 which feed tube preferably includes an outer casing or tube 32. While a metering screw technique is shown as one way of feeding the additive material into the feed tube, it should be recognized that other techniques, such as shown in U.S. Patents Nos. 2,792,030, 2,988,249 or 3,001,672, might be operable to accomplish this same end.

Tubes 30 and 32 extend into the hopper towards or adjacent the forward end thereof (to the right of the middle of the hopper 16 as shown in the drawing) the forward end being that end closest to the sprue end of the machine 10. It is also spaced a distance above the flights of the screw 18 so that its lowermost end is directly in an area of turbulence caused by the back flow of granules resulting from the action of the reciprocating screw 18, as explained more fully hereinbelow. This area of turbulence is indicated by the arrows 34.

Thus, the additive material does not feed directly to the screw as is typical of the prior art, but rather into an area of turbulence caused by the swirling action of resin particles directly above the screw 18. This area of turbulences is believed to be caused by the back flow of granules which are unable to enter into the cavity of the barrel 14, the barrel 14 normally not being able to accept the full charge of the screw due to the compression which develops during the injection molding process. This back flow is extremely active and the cycloidal direction of the swirling resin particles will be generally counterclockwise because of the counterclockwise rotation of the screw 18, in the arrangement shown. Thus, the area of greater turbulence is located generally towards the forward end of the hopper.

The direction of swirling resin particles presents, from the twelve o'clock to the six o'clock position (counterclockwise) a stream of resin particles moving downward. By locating the lower open end 31 of tube 30 such that it intersects this downward stream of resin particles, the additive material will be permitted to exit readily and/or be drawn out from the open end 31 of tube 30 to enhance the flow and intermixing of the additive material with the resin particles.

In practice it has been found that the desired results could be accomplished, for example, when a metered concentrate in the form of a pigmented pellet was intermixed with a high impact polystyrene resin granular material when the lower open end 31 of tube 30 was located approximately 1½" above the opening 17 in the top wall of barrel 14 and intersecting the downstream portion of the swirling resin particles.

However, in the event there is a plugging of the feed tube 30, it can be withdrawn and unplugged even with the hopper full because outer tube 32 would remain in the hopper so as to provide for ease of re-entry of the fill tube 30 into its proper location with respect to the resin particles located in the hopper.

While the method and apparatus of the present invention are primarily adapted for injection screw molding apparatus, it is conceivable that the invention hereof could be employed with other apparatus, and with other materials than thermoplastic materials such as, for example, certain thermosetting resins wherein the additives could be vulcanizing agents or accelerators which are incorporated with the thermosetting resins through the feeder tube 30. Thus, while certain representative embodiments and details have been shown for the purpose of illustrating the invention, it will be apparent to those skilled in the art that various changes and modifications can be made therein without departing from the spirit and scope of the invention.

Accordingly, what is claimed as new is:

1. An apparatus including a barrel containing a screw, a hopper in open communication with the interior of said barrel for feeding plastic resin particles to the screw, an additive feeder adjacent to said hopper for introducing additive materials with said plastic resin particles to said screw, said additive feeder including a feed tube extending downwardly into the throat of said hopper but spaced upwardly from said screw, the bottom open end of said feed tube intersecting an area of turbulence created by resin particles swirling above said screw towards a forward end of said hopper whereby a thoroughly intermixed blend of said resin particles and additive materials are fed to said screw.

2. The apparatus of claim 1 wherein the bottom open end of said feed tube intersects the downstream portion of the swirling resin particles.

3. The apparatus of claim 2 wherein the open end of said feed tube is located approximately one and one-half inches above said screw.

4. The apparatus of claim 1 wherein an outer casing surrounds said feed tube for substantially its entire length except for the open end thereof.

5. The apparatus of claim 1 wherein said apparatus is an injection molding machine.

6. A method for intermixing plastic resin particles and an additive material in a hopper feeding a screw of an injection molding machine, said method comprising the steps of introducing plastic resin particles to said hopper while the screw is turning, said screw being turned with sufficient speed to cause said resin particles to swirl above said screw toward the forward end of said hopper thereby creating an area of turbulence, and introducing said additive material into said area of turbulence whereby the swirling action of said resin particles results in a thorough intermixing of said resin particles and the additive material being fed to said screw.

7. The method of claim 6 wherein said additive material is introduced into the downstream portion of the swirling resin particles.

References Cited

UNITED STATES PATENTS

| | | |
|---|---|---|
| 3,148,412 | 9/1964 | Spreeuwers. |
| 3,168,291 | 2/1965 | Knoedler et al. _____ 259—9 |
| 3,182,969 | 5/1965 | Rupp _____ 259—25 |
| 3,228,065 | 1/1966 | Cournoyer et al. |

WALTER A. SCHEEL, Primary Examiner

JOHN M. BELL, Assistant Examiner

U.S. Cl. X.R.

18—12